Patented Jan. 11, 1927.

1,614,025

UNITED STATES PATENT OFFICE.

LESTER C. CONNER, OF MALDEN, MASSACHUSETTS, ASSIGNOR TO ALFRED S. WILLIAMS, OF BOSTON, MASSACHUSETTS, AND JOHN T. COLLINS, OF SANDWICH, MASSACHUSETTS, TRUSTEES.

COMPOSITION OF MATTER DERIVED FROM BLACK LIQUOR AND PROCESS OF DEALING WITH THE SAME.

No Drawing.   Application filed August 14, 1924. Serial No. 732,114.

This invention relates to compositions of matter obtainable from the spent or black liquor of the chemical wood pulp industry, and the art of producing molded solid articles from this liquor.

"Black liquor" is the usual name for the waste liquid resulting in the digestion of wood in the soda process and in the sulfate process of making pulp for paper. Although it represents about one-half the weight of the wood, it finds no direct use in the arts; and efforts heretofore made to discover uses for it or to recover values known to be in it have proved unavailing, except as to the alkali. Therefore the black liquor is generally evaporated until it becomes thick, and then is burned in order to regain its contained alkali. It is an object of the present invention to discover ways to utilize this hitherto wasted material. The black liquor is thought to comprise very many different chemical substances. These are not of well understood nature; but they are for the most part something called "lignin", which is a sort of group name for the noncellulose constituents of wood fibre; and the coniferous woods to which the soda and sulfate processes are usually applied have also various resinous bodies. Normally insoluble in plain water, all of these substances are however taken up by the caustic soda solution used in the said process; and they are accompanied by a wide variety of water-soluble materials of subordinate importance, acetic acid, sugars, soluble carbohydrates, etc.

By the invention the black liquor is treated chemically so as to produce a material which is herein, for convenience, referred to by the generic term of "wood gum"; and this I have found capable of manipulation by physical, chemical and/or physico-chemical processes to make derivative compositions of matter that are capable of being molded by heat and pressure into hard and smooth forms which are insoluble and are sufficiently tough and permanent to have a wide range of utility in the industrial arts.

A crude, and more or less impure, form of the wood gum is obtainable from the black liquor by a simple process of precipitation by adding acid, as for example, sulfuric acid. In the case of pine this is a fusible, dry, dark brown powder, which cannot be dissolved in water and is only about 50% soluble in methyl alcohol or in benzol. While this gum can be used for many purposes, it is preferred to work with a purified form which may be obtained by washing the crude wood gum to free it of salines and other water-soluble substances and then dissolving it in a suitable alkaline liquid, as for example caustic soda or ammonia; filtering to get rid of occasional fibres which are visible to the eye in the crude gum, and other impurities; and then adding acid to the filtered liquid, whereupon the purified form is obtained as a precipitate. The wood gum may be used as a molding composition in this form or in combination. Thus, it may be mixed with glue and the glue hardened with formaldehyde. For this the latter is introduced in the form of hexamethylenetetramine, and placed in a mold. With the addition of pressure, and heat, the charge flows into the form of the mold, and the heat liberates formaldehyde so that the glue is hardened in the molded shape. At the same time the wood gum, softened by the heat, solidifies in the new shape. Thus it holds tenaciously, both by its own inherent properties and because of its intimate mixture with the hardened glue. In a somewhat similar manner the wood gum in powdered form may be mixed with shellac; and when both have been softened by heat they together assume the shape of the mold, and cool as a solid mass in the molded shape. Also, the gum alone can be molded without any added binder such as glue or shellac. After being softened or fused by heat in the mold it hardens into a black, firm molded article.

As regards the glue and the shellac, I have not observed that any chemical reaction occurs between either of them and the wood gum; but the wood gum may be made to react chemically, as with formaldehyde. In this case the formaldehyde disappears, and a new compound results which appears to be only slightly fusible when heated in the open air, but which can be fused by heat and pressure when secluded, as in a mold, and which hardens into a resistant solid. A product which can be similarly molded is obtainable by combining the wood gum with phenol, as by adding cresylic acid to the black liquor or a purified form thereof, and treating with acetaldehyde. In this case a vigorous reaction occurs with spontaneous heat. This being over, the product is neutralized with acid, and a viscous mass in the nature of a condensation product separates, which being washed and dried can be ground fine making a dark brown powder, easily fusible. This can be then softened in a mold, under heat and pressure, from which state it solidifies into a molded article which is not easily fusible or soluble, if at all. Also a condensation product may be made from the combination of the wood gum and phenol on the one part with formaldehyde on the other part, upon which a reaction follows producing a light brown condensation product which differs from the well known phenol-formaldehyde condensation product, but which can be molded under heat and pressure, solidifying into a black molded article which is strongly cohesive, hard, durable and resistant. Considering this as a co-condensation product, inasmuch as the caustic soda which keeps the wood gum in solution also dissolves other organic bodies, including phenols, it illustrates how to effect co-condensation of the wood gum or liquid with such other organic bodies, affording a variety of new and useful products. These products are useful for the plastic arts where wood gum and phenols are in alkaline solution, and the co-condensation is effected with the aid of formaldehyde, but the properties of the co-condensed products are not merely the sum of the properties of the two materials separately condensed with formaldehyde; nor are they the properties of either alone. They, however, have the hardness of the black liquor products without their brittleness.

While the wood gum has been mentioned as one of the initial ingredients in the above sketch of the invention, it is possible to omit the stage of precipitating this gum, and to apply the process of the invention directly to the black liquor, either in crude or in purified form. By thus eliminating much of the labor and the time for drying and grinding the powder the cost of the process is very greatly reduced, below its already low figure. Moreover, it is found that in making the ultimate molded article a filler of suitable sort may usually be employed with advantage, such as wood flour, while retaining or even increasing the cohesive strength of the ultimate product. Other aldehydes may be used, for example, furfural. And in lieu of the cresylic acid mentioned, any other convenient phenol may be used, as the various wood creosotes, "coal tar creosotes", tarry phenols, etc.

It will thus be seen that the invention can be produced with various materials and with considerable variation in the steps employed.

Fundamentally the invention is concerned with certain of the dissolved matters of the black liquor which by the invention are capable of conversion into various substances useful for plastics. Such derivative substances may be obtained either immediately by acid precipitation or less proximately by a process involving further chemical reaction; and they may be utilized either per se, or in admixture with a known binder such as shellac or glue, by a molding and baking process, or by further change into a chemical compound in which an aldehyde first reacts with it to produce a partial condensation product whose complete hardening occurs after the product at this stage has been arranged in a mold with suitable filler and has been then subjected to heat and pressure. The wood gum by itself, as derived directly from the black liquor, is also useful as an antiseptic, and for other purposes.

The invention thus opens a large new field in the industrial arts, based on the processes which can be carried out and the useful articles which can be made from the materials which have hitherto been wasted in the black liquor. It is intended that the patent shall cover by suitable expression in the appended claims, whatever features of patentable novelty exist in the invention disclosed.

Illustrative examples of the invention, showing the manner and process of making, constructing and compounding and using it will now be given in greater detail. In order to get uniform and the best results it will for many purposes be preferred to eliminate from the black liquor foreign and undigested matter which may be therein and also to eliminate water-soluble ingredients. To this end the residual alkaline liquor, called black liquor, derived from coniferous woods in the soda process or the sulfate process of preparing pulp for the manufacture of paper, may be acidified. The customary evaporation process of this liquor may be omitted, and the acidification carried out with sulfuric acid, which is preferred because of its low cost, although probably any other acid may be used. Thereby a precipitate is formed, which is black, leaving a practically colorless liquid. This being poured off, the precipitate which is mainly made up of derivatives of the wood that are normally insoluble in water, presumably including the group of substances called lignin, and resin-acids, etc., may be manipulated, or broken fine and washed with water, thus removing such water-soluble solids and such liquids, acetic acid, sugars, etc. as did not go with the liquid but remain in or with the precipitate; and the washed precipitate may then be dried, particularly if it is to be used in this form as a molding compound. If necessary or desired it may be ground to aid the drying or to aid the uniformity of its mixture with other ingredients as glue, shellac, wood flour, in molding. If, however, the wood gum is to be treated further chemically, this drying step would not be necessary in commercial operation. In either event it is next dissolved in a caustic soda solution. For an illustrative example one may take 300 grams of washed and dried precipitated material and dissolve that in a solution of 1000 grams of water and 100 grams of caustic soda, the important feature being to have sufficient of the caustic soda to dissolve all of the gum. To that mixture may be added 300 grams of crude cresylic acid (99%, straw color); and to that 600 grams of formaldehyde, 40% solution. The mixture being then heated, for example to 50° C., a reaction occurs; after which the whole is allowed to cool; and then it is to be neutralized, for which purpose I have found nitre-cake or sodium acid sulfate, $NaHSO_4$, serviceable, although other acids might be used, whereupon a viscous mass like putty separates. This mass, which is not sticky, may be washed with water and spread out to dry in the open air, by which process its viscous nature departs, and it can be ground. Being then thoroughly washed and dried, it appears as a light brown powder. This condensation product is fusible and is used to make the finished molded compound preferably by thoroughly mixing with a filler such as wood flour, for which compound I have taken the condensation product and the filler in about equal proportions. This powder mixture being poured into a mold, to which pressure and heat are applied, as, for example, about 150° C. and 3000 pounds, the mass softens, molds and after a few minutes under heat is completely set, producing a smooth, black, strong article.

In place of the formaldehyde one may use acetaldehyde with successful results. The reaction is somewhat more violent. For the molding of a composition of 50 parts of this condensation product and 50 parts wood flour, hexamethylenetetramine may be added to the extent of 20 parts, for its hardening effect although hardening is not necessary. This mixture being heated to 160° C. and compressed for a few minutes the molded product results. The acetaldehyde condensation product thus used is obtained as follows: 60 grams of the precipitated wood gum above described being dissolved in a solution composed of 20 grams of caustic soda and 200 c. c. of water, boiled together until the gum is clearly dissolved, cresylic acid is added and the entire mixture is cooled to room temperature. Acetaldehyde now being added, a vigorous reaction takes place with spontaneous heat. A separation occurs of two layers, one dark and liquid like the original black liquor and the other light yellowish and small in amount. The whole is allowed to stand until the reaction is completed, and then is warmed to 75° C., and let stand an hour; and 43 c. c. of 50% sulfuric acid being added, a viscous mass separates, as in the case of the formaldehyde, which being washed and dried has a dark brown color and is easily fusible; this being the condensation product of acetaldehyde and gum above referred to.

However, it is not necessary to add phenol to the wood gum in order to get successful results. Thus, taking 60 grams of the wood gum, 20 grams of caustic soda, 200 c. c. of water; boiling until the mixture is homogeneous; cooling to 40 or 50° C. and then adding 60 grams of formaldehyde, no heat effect is noticed from the addition of the formaldehyde, the characteristic order of which continued in the mixture. But upon warming to 80° C. and allowing to stand an hour cooling, the odor of formaldehyde is found to be gone, and the odor is of an alkaline nature, similar to that of the original black liquor. From this, with 13.5 c. c. of 50% sulfuric acid a precipitate is made which is nearly black (very dark brown) having a burned sugar odor. The mixture may become so thick that it can be stirred only with difficulty; in which case it may be advisable to add water for thinning it. In one instance 186 c. c. of water having been thus added, and the product being filtered, washed and then dried, it was found to have a weight of 53 grams. Some of the particles appear to have a vitreous fracture, but the product is not fusible in the open air, decomposing instead at a high heat, with flame. This condensation product is clearly something different from the original gum, because in addition to the above noted disappearance of formaldehyde, quickly when the temperature was raised and with a reaction proceeding rapidly, it is also observed that whereas the gum upon being heated can be molded together into a ball, this condensation product under the same conditions is not sufficiently adhesive to do this, but simply burns. When this condensation product is molded with an equal amount of wood flour added, and with formaldehyde, but without any addition of phenol, it is observed that the material seems to set more quickly than when the phenol has been added. As in the other cases, articles molded from this have satisfactory strength and aspect.

Instead of going through the preliminary step above described of obtaining a solid wood gum from the black liquor, the wood condensation product may be obtained from the black liquor direct, even without preliminary purification, although with slightly different results as follows: The black liquor being preferably concentrated to half its volume, by evaporation, the desired amounts of phenol and formaldehyde are added, and the mixture is heated to 80° C.; and then after standing an hour or so is precipitated with sulfuric acid; giving a yield considerably greater in weight than the ordinary yield for the process which has been described with the solid wood gum. This condensation product differs also in that it does not come out in the plastic form, but is granular, which makes it easier to handle; and the powder is very light in color, with no characteristic whatever of sticking together. This can be dried in a very short time into brittle form for fine grinding, without the long and relatively difficult drying characteristic of the product described above. The molded product, made from equal amounts of this and wood flour, resembles the previously described molded products in that it appears to have satisfactory strength and durability for industrial uses. In determining the amount of phenol to be added to the black liquor in this species of the invention, the effort may be made to use an amount of phenol equal to the wood gum equivalent of the liquor; and the amount of formaldehyde to be used would be double this, these being the particular proportions which are herein assumed, for purposes of describing the invention, although, as will be readily understood, there may be variations from these proportions in practice; and for this purpose a preliminary test of the qualities of the black liquor may be made by precipitation, filtering, washing, drying and weighing a sample quantity, to find how much wood gum material there is in the particular black liquor that is at hand and at the particular degree of concentration which it happens to have. In one example it was found that 1000 c. c. of black liquor was the equivalent of 40 grams of wood gum, to which was added 40 grams of phenol and 80 grams of formaldehyde, the caustic soda being already in the solution. In this particular case the precipitation of the condensation product was effected by 30 c. c. of 50% sulfuric acid, from which there came a yield of 140 grams of condensation product. Contrasting this with the combined weight of wood gum and cresylic acid or phenol (80 grams), this indicates that certain materials in the black liquor which are lost by the above described purification processes are saved and utilized by this method of making the black liquor itself an ingredient for gettting the condensation product.

The temperature above stated for the various stages of reaction are not definitive in the sense that the process of the invention cannot be carried out at other temperatures. For example, although 50° C. has been mentioned as a suitable temperature for starting the reaction, it has been found that upon starting it at 80° C. (wood gum plus phenol plus formaldehyde) the reaction proceeds very violently, the temperature rising in 5 or 10 minutes to 95 to 100° C. and with a tendency of boiling over. In this instance upon taking off the cover and letting it stand till it falls to room temperature, and then applying the above steps of acidifying and precipitating, the product is found to be apparently infusible, does not look resinous, and in powder form appears grey with a suggestion of brown, but upon placing in the mold, heating and pressing as above described a fusion or equivalent rearrangement occurs, and a hard, smooth satisfactorily molded article results.

For cases where a molded article is to be made from the wood gum direct with aid of glue, one may take 10 parts of wood gum, 10 parts of wood flour or other filler, 4 parts of glue and 1 part of hexamethylenetetramine. The glue may be ordinary glue of commerce of animal origin and if desired may be less in proportion than above specified, e. g. 2 parts of glue. The hexamethylenetetramine if desired may be taken in greater proportion, allowing the above to react on the glue as a hardener, and allowing as much more to react on the wood gum. The ingredients may be mixed cold, put into the mold, and pressed hot, e. g. at about 40° C. for a few minutes.

In any of these cases the pressure used may be only that needed to carry out the molding operation satisfactorily. In cases where a form of the invention is used which fuses in open air, it appears that articles can be cast from it, without pressure; but the use of pressure between dies is both a quick and an inexpensive method of procedure, and it has the advantage of excluding air so as to prevent the occurrence of any combustion.

In making the condensation product of wood gum, phenol and formaldehyde above described, any convenient commercial phenolic material may be used. No catalyst is required to carry through this or any other process herein described. The acidifying is preferably done slowly, and any acid can be used, even products of combustion. The precipitate comprising the condensation product separates as a gray solid; but the color changes to brown upon standing in air. The grinding or comminuting step is to aid the thoroughness of the washing which follows; and also to put the material into form best suited for molding. The processes above defined are as performed with an ordinary screw press, in which the dies are first heated to the desired degree, but the pressure of 3000 pounds estimated, in these instances is not required for successful operation; and the temperature also may be varied. The product becomes hard in a few minutes in the mold. It will be observed that in each case the process is very simple, in that the materials can flow in cold, in powdered form, and the process is completed by a sort of baking.

The invention has thus been set forth so that anyone can practice it without need to determine the exact chemical nature of certain materials, especially the wood gum and the condensation products to which it contributes, because the exact nature of some of these may prove a difficult chemical problem, about which opinions may differ. One may say, however, that when the black liquor comes from coniferous woods, which are likely to afford the greatest field for utility of the invention, the wood gum precipitated from the black liquor by acidification is believed to be largely lignin and resin-acids, the clear liquor remaining being a sodium sulfate solution—assuming that sulfuric acid was used for the precipitation. These ingredients of the wood gum being known, chemical methods already understood may be employed to separate them and to utilize either separately, and for other purposes than those herein set forth, if desired.

I claim:

1. A composition of matter comprising a solid derivative of black liquor adapted to be heat-molded.

2. A molded article of composite ingredients comprising as a principal ingredient a solid derivative of black liquor.

3. A plastic material, comprising a reaction product of an aldehyde with black liquor.

4. A plastic material, comprising a reaction product of an aldehyde with black liquor and a phenolic body.

5. A molded article comprising a mixture of the product resulting upon acidification of black liquor with a binder.

6. A molded article comprising a mixture of the product resulting upon acidification of black liquor with a condensation product of a phenolic body with an aldehyde.

7. A molded article comprising a co-condensation product of a black liquor derivative and a phenolic body with an aldehyde.

8. A plastic material comprising a powder, being the dried condensation product, of the precipitate thrown down from black liquor by an acid, and an aldehyde.

9. A plastic material comprising a condensation product of reaction of acetaldehyde with a derivative of black liquor and a phenolic body.

10. In the manufacture of plastic material, the process which comprises precipitating black liquor with an acid, redissolving the precipitate in alkali solution and adding an aldehyde.

11. In the manufacture of plastic material, the process which comprises precipitating black liquor with an acid, redissolving the precipitate in alkali solution and adding formaldehyde.

12. In the manufacture of plastic material, the process which comprises mixing an alkaline solution of black liquor solids with an aldehyde and a phenolic body and allowing the mixture to undergo spontaneous reaction.

13. In the manufacture of plastic material, the process which comprises mixing an alkaline solution of black liquor solids with an aldehyde and a phenolic body, allowing the mixture to undergo spontaneous reaction and separating the condensation formed by acidification of the solution.

Signed at Boston, Massachusetts, this thirtieth day of July, 1924.

LESTER C. CONNER.